United States Patent Office 3,324,739
Patented June 13, 1967

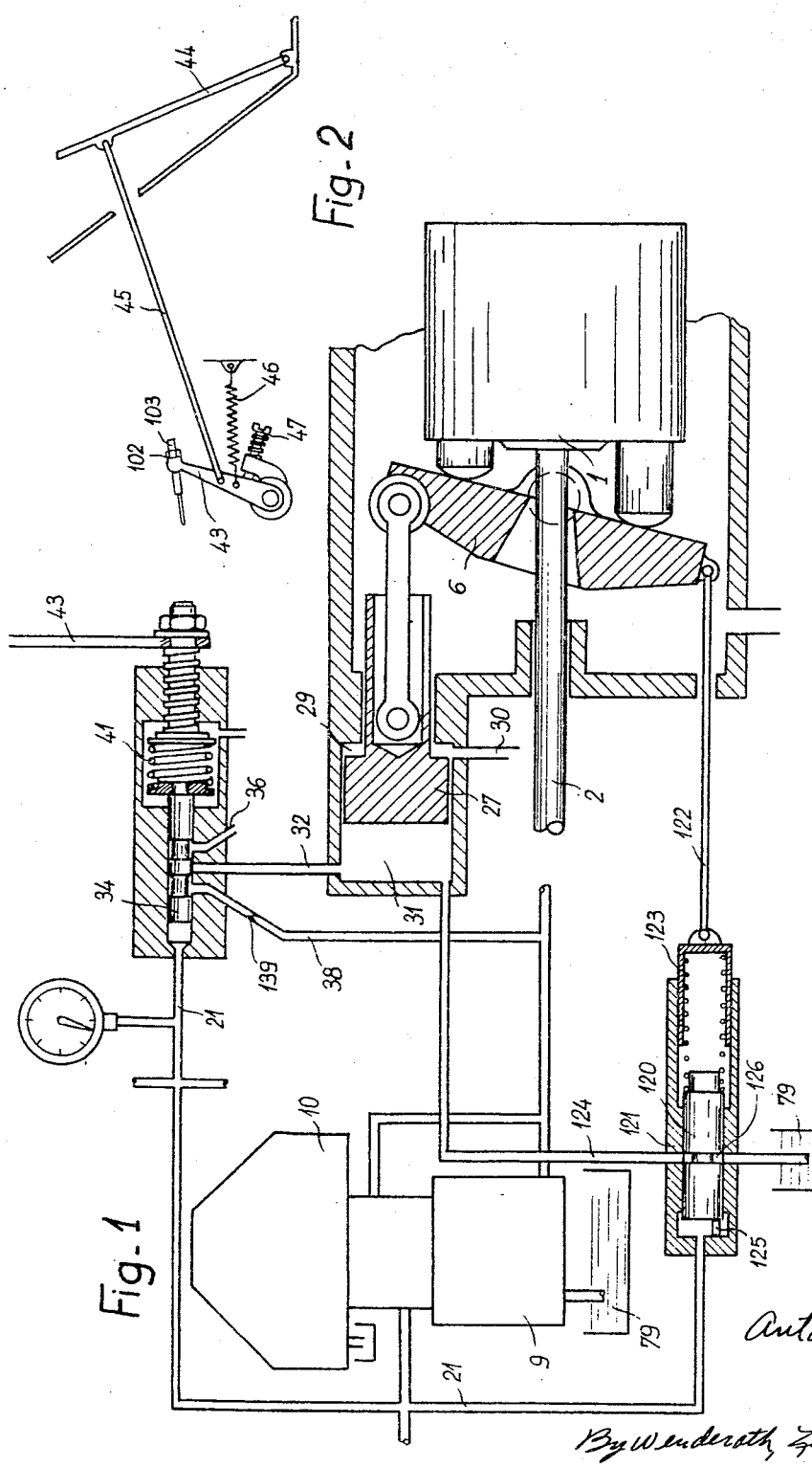

3,324,739
AUTOMATIC REGULATION SYSTEMS OF HYDROSTATIC TRANSMISSIONS FOR AUTOMOTIVE VEHICLES
Antoine Brueder, Paris, France, assignor to Societe Anonyme Andre Citroen, Paris, France, a corporation of France
Filed June 28, 1965, Ser. No. 467,576
Claims priority, application France, July 3, 1964, 980,653, Patent 86,115
1 Claim. (Cl. 74—472)

In Patent S.N. 267,553 of Mar. 25, 1963, now Patent No. 3,283,606, there is described an automatic regulation system for a hydrostatic transmission equipping an automotive vehicle, this transmission comprising a variable-capacity pump provided with a piston-driving rotary plate adapted to be set in different inclination to modify the stroke of the pistons sliding in cylinders disposed like the bores of a revolver cylinder, this pump being driven from the internal combustion engine of the vehicle and adapted to deliver liquid under pressure to hydraulic motors actuating in turn the wheels of the vehicle.

This regulation system comprises a circuit in which the pressure created by an auxiliary feed pump is adjusted by a centrifugal regulator as a function of the velocity of rotation of the internal combustion engine, this circuit supplying control apparatus, notably a cylinder adapted to control the inclination of the pump plate by means of a slide valve responsive on the one side to said pressure and on the other side to a spring of which the tension is subordinate to the position of the accelerator pedal.

With this device, when the driver depresses the accelerator pedal the plate control cylinder tends to be vented to the atmosphere, thus reducing the volumetric capacity of the pump; this is equivalent to increasing the reduction ratio between the pump and the motors driven thereby.

When on the other hand the driver releases the accelerator pedal the cylinder tends to restore low reduction ratios in the transmission and as a rule the regulation system, when the resistant torque is relatively low, tends to create a state of balance between a low engine speed and a moderate reduction ratio.

This fact may be a source of inconveniences when picking up or during a slowing down from a relatively moderate speed.

It is the object of this invention to provide a complementary device whereby a greater reduction ratio in the pump operation may be obtained both when picking up speed or when releasing the accelerator pedal.

With this device a leakage in the control cylinder is obtained by using an auxiliary slide valve which on the one hand is responsive to the pressure in the regulation circuit and on the other hand is operatively connected to the plate in opposition to said control cylinder through the medium of a calibrated compression spring, the force of this spring being such that it is fully expanded when the control pressure value corresponds to a first value of the velocity of rotation of the internal combustion engine, and compressed home when said control pressure value corresponds to another value of the velocity of rotation of said engine which is considerably higher than said first value of said velocity of rotation.

With this arrangement the pump is kept in a position providing a high reduction ratio either when the accelerator is released or during pick-ups, the vehicle having already attained a mean velocity.

In order to afford a clear understanding of this invention and of the manner in which the same may be carried out in practice, reference will now be made to the attached drawing in which:

FIGURE 1 is a diagrammatical, part-sectional view showing the device constituting the subject-matter of the said patent but comprising the arrangement of this invention, and FIGURE 2 is a detail view showing the operative connection with the accelerator pedal according to the said patent.

It is not deemed necessary to describe herein in detail the construction and operation of the regulation system set forth in the said patent, to which reference may be made if necessary; it is only sufficient to remind that a pump 1 of the barrel type, equipped with a variable-inclination drive plate 6 is driven from the power shaft 2, the plate 6 being controlled by means of a cylinder system comprising a differential piston 27, the chambers 29 and 31 formed on either side of this piston being connected through pipe lines 30 and 32 to a circuit in which a regulated pressure is maintained, this circuit being fed by means of a pump 9 through the regulator 10 as a function of the velocity of rotation of the power or output shaft 2 of the internal combustion engine; this adjusted pressure is also applied through the pipe line 21 to the distributor 34.

This second pressure is applied to one side of slide valve 34 responsive on the other side to the pressure of a compression spring 41 compressed by a lever 43 in proportion to the degree of depression of the accelerator pedal 44 connected through a link 45 to this lever.

According to the present invention there is associated with this device another slide valve 120 mounted in a cylinder 121 having one end connected to the pipe line 21 in which the fluid pressure is proportional to the engine speed as delivered by the centrifugal regulator 10, and the other end connected through a rod 122 to the plate 6 (at a point diametrically opposite to that acted upon by the rod of piston 27), a calibrated compression spring 123 being disposed between said slide valve and said rod 122.

This slide valve is further inserted in a pipe line 124 having one end connected to the main chamber 31 of piston 27 and the other end connected to the reservoir 79.

The provision of this slide valve 120 eliminates the use of an adjustable resistance in the circuit section 32 (for example of the type described in the said patent and shown in FIGURE 3 of this patent) and also of the resistance 39 in the pipe line 38. However, a fixed or manually adjustable loss of pressure may be maintained in this pipe line as shown diagrammatically at 139 in the attached FIGURE 1).

To facilitate the understanding of the mode of operation of this arrangement it will be assumed that the force of spring 123 is such that it can only be compressed when the pressure created by the centrifugal regulator 10 corresponds to a velocity of rotation of 1,500 r.p.m. of the internal combustion engine, and that it is compressed home when the engine speed has attained 3,000 r.p.m.

It will firstly be reminded that the position of plate 6 is subordinate to the position of the differential piston 27 which results from the equilibrium between the thrusts caused by the pressures prevailing in chambers 29 and 31, so that the position of the bearing point presented by the rod 122 to the aforesaid spring 123 will depend on the plate inclination, and that the slide valve 120 cannot control the movement of the plate 6 by means of said rod 122, since the slide valve is movable only as a consequence of the compression of said spring 123.

Assuming now that the vehicle is driven with the engine revolving at a velocity inferior to 1,500 r.pm., the slide valve 120 is fully depressed to the left-hand end of its cylinder by the spring 123, as seen in the figure, and engages an end stop 125; in this slide valve position (as shown in the figure) the pipe line 124 is opened by the presence of the groove 126, whereby the chamber 31 will be discharged through this line 124 to the reservoir, thus keeping the piston 27 of the control cylinder depressed to the left and setting the plate 6 in its position of lowest inclination and therefore of lowest volumetric capacity; if, under these conditions, the engine is accelerated, the slide valve 120 will remain in the same position until the engine revolves at a velocity in excess of 1,500 r.p.m., at which speed the slide valve is moved to the right and cuts off the pipe line 124, whereby the piston 27 may then be moved to the right and increase the inclination of plate 6, thus tending to move the piston 120 to its initial position; it is clear that for engine speeds ranging from 1,500 to 3,000 r.p.m. there is a position of equilibrium controlling the plate position or inclination; in other words, to each r.p.m. figure there is a given volumetric capacity which the pump cannot overstep.

When the engine speed is in excess of 3,000 r.p.m., the spring 123 is compressed home by the pressure prevailing in pipe line 21 and the slide valve 120 is so positioned as to cut off the pipe line 124 (irrespective of the plate inclination).

When the accelerator pedal is released the chamber 31 is firstly connected to the regulated-pressure circuit and the reduction ratio tends to decrease; then, as the engine speed drops below 3,000 r.p.m., it is vented to the reservoir through the slide valve 120 and pipe line 124. Under these conditions the plate 6 is immediately restored to its position of minimum or zero inclination and therefore of moderate volumetric capacity of the pump.

It will be seen that with this arrangement in the case of a pick up the reduction ratio is already preselected and the engine acceleration is facilitated whereas in case of release of the accelerator pedal a reduction ratio is maintained between the pump and the motors driven thereby, thus providing an efficient braking action by means of the engine.

What is claimed is:

Improvement in an automatic regulation system for hydrostatic transmission of an automobile vehicle having a thermal engine, said transmission comprising a hydraulic pump driven from the vehicle engine and at least one hydraulic motor actuated by said pump, said device comprising a disc adapted to be set in different angular positions for controlling the variation in the output of said pump and therefore the torque demanded from said thermal engine, a hydraulic circuit, a feed pump having inlet and outlet ports, a centrifugal device associated with said pump for delivering to said hydraulic circuit a pressure of a value proportional to the velocity of rotation of said thermal engine, said circuit comprising means for controlling the delivery of fuel to said thermal engine feed circuit, said means being responsive on the other hand in an unidirectional manner to an accelerator pedal, a valve for short-circuiting said inlet and outlet ports of said pump, a hydraulic cylinder adapted to modify the inclination of said pump disc and a second valve controlling said hydraulic cylinder, said improvement consisting in disposing, in an auxiliary pipe line connecting the main chamber of the cylinder driving the inclinable plate of the pump to the reservoir, a slide valve responsive to the antagonistic forces of a pressure subordinate to the velocity of rotation of the internal combustion engine and of a calibrated spring reacting on a movable member connected to said inclinable plate, said spring pushing said slide valve home against the pressure subordinate to the engine speed until a first predetermined value of said speed is attained, and being fully compressed by said slide valve when said pressure attains another predetermined value for an engine speed considerably higher than said predetermined value.

References Cited
UNITED STATES PATENTS

| | | | |
|---|---|---|---|
| 3,202,012 | 8/1965 | Jania | 74—472.1 |
| 3,256,747 | 6/1966 | Kempson | 74—472.1 |
| 3,283,606 | 11/1966 | Brueder | 74—472.1 |
| 3,286,543 | 11/1966 | Porter | 74—472.1 |

ROBERT M. WALKER, *Primary Examiner.*

H. S. LAYTON, *Assistant Examiner.*